United States Patent
Nishibata et al.

(10) Patent No.: US 6,994,473 B2
(45) Date of Patent: Feb. 7, 2006

(54) GREASE REPLENISHING DEVICE

(75) Inventors: Shinji Nishibata, Kanagawa (JP);
Yasushi Morita, Kanagawa (JP);
Susumu Takano, Ratingen (DE)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/237,731

(22) Filed: Sep. 10, 2002

(65) Prior Publication Data

US 2003/0133635 A1    Jul. 17, 2003

(30) Foreign Application Priority Data

Sep. 10, 2001   (JP)   ................ P. 2001-273834

(51) Int. Cl.
F16C 33/66    (2006.01)
F16N 27/00    (2006.01)

(52) U.S. Cl. .................. 384/473; 384/475; 184/7.4

(58) Field of Classification Search ............ 384/462, 384/466, 467, 471, 473, 474, 475; 184/5, 184/5.1, 7.4, 26, 32, 105.1, 105.2
See application file for complete search history.

(56) References Cited

U.S. PATENT DOCUMENTS

| | | | | |
|---|---|---|---|---|
| 4,108,506 A | * | 8/1978 | Osborn | 384/471 |
| 4,157,132 A | * | 6/1979 | Kramer | 184/7.4 |
| 4,758,100 A | * | 7/1988 | Guttinger | 384/399 |
| 4,784,500 A | * | 11/1988 | Prokop | 384/462 |
| 4,836,334 A | * | 6/1989 | Bras | 184/45.1 |
| 4,895,460 A | * | 1/1990 | Grzina | 384/132 |
| 5,060,760 A | * | 10/1991 | Long et al. | 184/6.4 |
| 5,327,995 A | * | 7/1994 | Ishii et al. | 184/5 |
| 5,423,399 A | * | 6/1995 | Smith et al. | 184/5.1 |
| 5,484,212 A | * | 1/1996 | Guaraldi et al. | 384/462 |
| 5,620,060 A | * | 4/1997 | Bialke | 184/104.1 |
| 5,711,615 A | * | 1/1998 | Stitz et al. | 384/473 |

FOREIGN PATENT DOCUMENTS

| | | |
|---|---|---|
| CN | 2166301 Y | 5/1994 |
| GB | 2 055 431 A | 3/1981 |
| JP | 61-124800 A | 6/1986 |
| JP | 1-67332 A | 4/1989 |
| JP | 5-45245 UM A | 6/1993 |
| JP | 5-52350 A | 7/1993 |
| JP | 5-57445 A | 7/1993 |
| JP | 5-57446 A | 7/1993 |
| JP | 5-87326 A | 11/1993 |
| JP | 7-103228 A | 4/1995 |
| JP | 9-14274 A | 1/1997 |
| JP | 2000-192972 A | 7/2000 |
| JP | 2000-230694 A | 8/2000 |
| JP | 2000-291667 A | 10/2000 |

\* cited by examiner

Primary Examiner—Thomas R. Hannon
(74) Attorney, Agent, or Firm—Sughrue Mion, PLLC

(57) ABSTRACT

A grease replenishing device replenishes a grease-lubricated rolling bearing with a grease. The grease replenishing device has a storage chamber portion and a pressing member. The storage chamber portion stores the grease. The pressing member pushes the grease out of the storage chamber into an interior of the rolling bearing.

19 Claims, 3 Drawing Sheets

GREASE REPLENISHING DEVICE

BACKGROUND OF THE INVENTION

The present invention relates to a grease replenishing device for replenishing a grease-lubricated rolling device with a grease which bears a spindle that operates at a high rotary speed, etc.

There are many mechanisms for replenishing a low rotary speed rolling bearing with a grease to prolong the lifetime thereof. However, little or no mechanisms for controlling the amount of grease to be supplied into a high rotary speed rolling bearing have been put to practical use.

When a rolling bearing operates at a high rotary speed while being replenished with a grease without sufficient control, possible excessive rise of the amount of grease causes rapid heat generation or possible excessive reduction of the amount of grease causes improper lubrication of the bearing leading to seizing.

SUMMARY OF THE INVENTION

The invention has been worked out under these circumstances. It is an object of the present invention to provide a grease replenishing device which normally replenishes a rolling bearing with a grease and thus can prolong the lifetime thereof even in a high rotary speed operation.

The aforementioned object of the present invention is accomplished by a grease replenishing device for replenishing a grease-lubricated rolling device with a grease, comprising:

a storage chamber for storing a grease; and a pressing member for pushing the grease out of the storage chamber into the interior of the rolling bearing.

Further, the aforementioned object of the present invention can also be accomplished by a grease replenishing device for replenishing a grease-lubricated rolling device with a grease, comprising:

a first storage chamber for storing a grease;

a second storage chamber for receiving a part of the grease stored in the first storage chamber; and a pressing member for timely pushing the grease out of the second storage chamber into the interior of the rolling bearing.

In accordance with the grease replenishing device according to the present invention, the grease which has been initially enclosed in the interior of the rolling bearing can be timely and accurately replenished with a predetermined amount of grease, making it possible to keep the bearing fairly lubricated over an extended period of time and hence prevent rapid heat generation and improper lubrication resulting in seizing of the bearing. Accordingly, the lifetime of the bearing can be prolonged.

The aforementioned pressing member may be a piston driven by a pneumatic or gas pressure actuator.

The aforementioned pressing member may be pneumatically driven but is preferably driven by the rotation of a screw.

In the aforementioned constitution, the grease stored in the first storage chamber may be normally energized toward the second storage chamber.

Moreover, the above-mentioned object of the present invention can also be achieved by a grease replenishing device for replenishing a grease-lubricated rolling device with a grease, comprising:

a storage chamber for storing a grease;

a pressing member for intermittently pushing a part of the grease out of the storage chamber to supply a predetermined amount of the grease into the interior of the rolling bearing; and a feed passage communicating between the storage chamber and the rolling bearing for allowing the grease to flow into the rolling bearing.

Despite its simple structure, the grease replenishing device of the present invention can timely and accurately replenish the grease which has initially been enclosed in the interior of the rolling bearing with a predetermined amount of the grease, making it possible to keep the bearing fairly lubricated over an extended period of time.

The aforementioned feed passage preferably has the same sectional area as the area of a circle having a diameter of from 0.5 mm to 5 mm.

DETAILED DESCRIPTION OF THE PREFERRED EMBODIMENTS

Embodiments according to the present invention will be described in detail in connection with the attached drawings.

Figure 1:
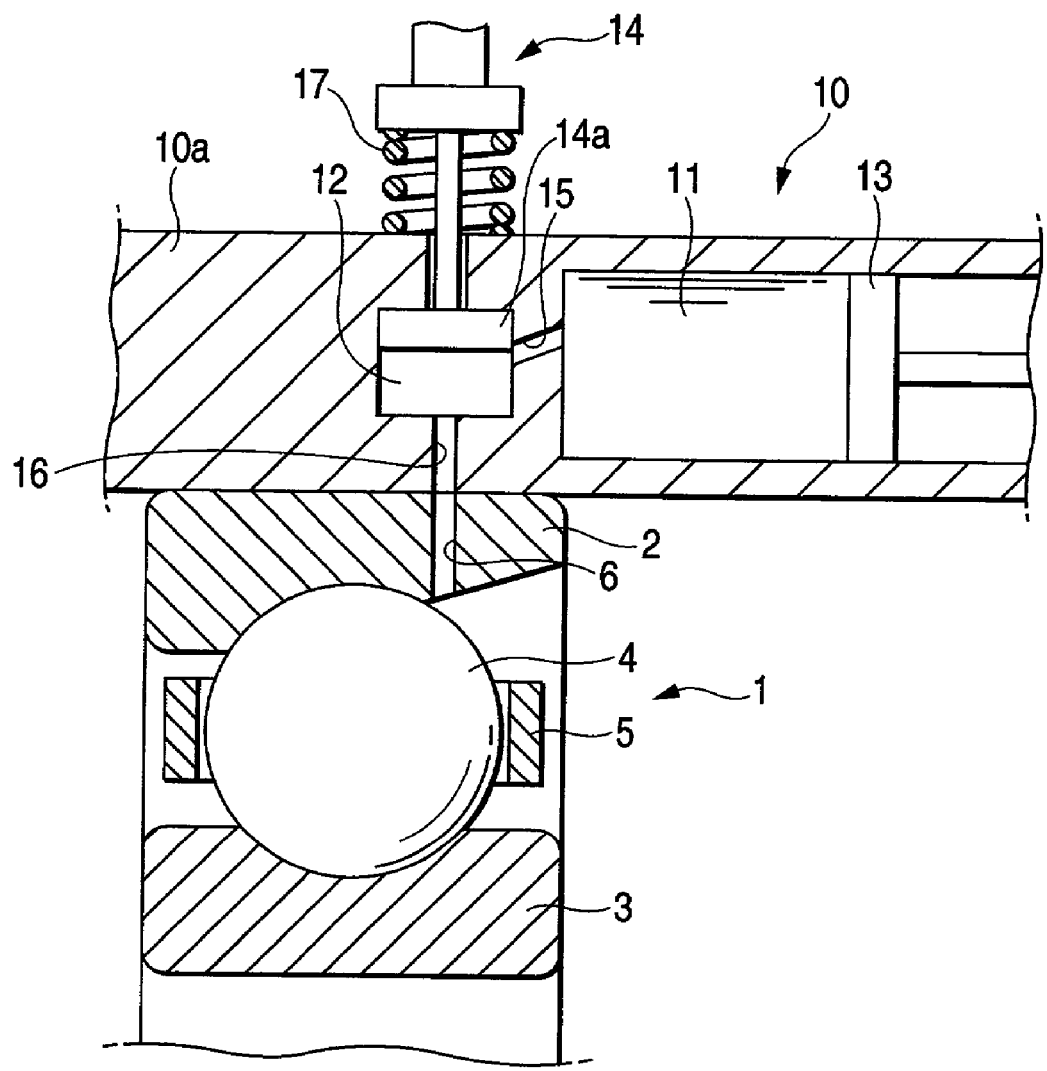
FIG. 1 is a sectional view illustrating a grease replenishing device according to a first embodiment of the present invention and a rolling bearing replenished with a grease by the-grease replenishing device.

FIG. 1 is a sectional view illustrating a first embodiment of the grease replenishing device of the invention. A rolling bearing (ball bearing) 1 to be replenished with a grease generally comprises an outer ring 2, an inner ring 3, rolling elements (balls) 4 rotatably interposed between the outer ring 2 and the inner ring 3, and a retainer 5 for rollably retaining the rolling elements at regular intervals along the periphery of the rolling bearing.

The rolling bearing 1 is arranged such that the outer surface of the outer ring 2 is fitted on the inner surface of a housing 10a. In the outer ring 2 is formed a grease supply hole 6 which communicates to the interior of the rolling bearing 1 and opens at the inner surface of the outer ring so that the grease supplied from a grease replenishing device 10 can flow into the interior of the rolling bearing.

The grease replenishing device 10 comprises a first storage chamber 11 for previously storing a grease and a second storage chamber 12 for receiving a part of the grease stored in the first storage chamber 11 through a communicating path 15. To the lower side of the second storage chamber 12 is connected a feed passage 16 communicating to the grease supply hole 6 of the rolling bearing 1. The first storage chamber 11, the communicating path 15, the second storage chamber 12 and the feed passage 16 are formed in the housing 10a.

The grease storing capacity of the second storage chamber 12 is smaller than that of the first storage chamber 11 and needs only to be great enough to receive the grease in an amount to be supplied into the rolling bearing at a batch. In other words, the capacity of the second storage chamber 12 can be arbitrarily predetermined taking into account the desired amount of the grease to be supplied into the rolling bearing 1.

The feed passage 16 has the same sectional area as the area of a circle having a diameter of from 0.5 mm to 5 mm and is connected to the grease supply hole 6 of the rolling bearing 1 at the site where the rolling bearing 1 and the grease replenishing device 10 are connected to each other (on the inner surface of the housing 10a). In the present embodiment, the feed passage 16 has a constant circular section over the entire length.

The first storage chamber 11 has a piston 13 as an energizing member provided on the side thereof opposite the communicating path 15. The piston 13 is pneumatically or gas pressure-driven to normally push the grease toward the communicating path 15.

The second storage chamber 12 has an air cylinder (or gas cylinder) as a pressing member 14 provided on the side thereof opposite the feed passage 16 (upper side). The communicating path 15 opens at the side of the second storage chamber 12. The piston 14a of the pressing member 14 is arranged to push the grease stored in the second storage chamber 12 toward the feed passage 16 at a pressure of from 0.1 MPa to 0.5 MPa.

The grease replenishing device 10 has a spring member 17 for energizing the piston 14a of the pressing member 14 provided on the side thereof opposite the feed passage 16. In this arrangement, when the pressing member 14 is released from pressing force, the piston 14a returns to the original position which was set before the extrusion of the grease (position shown in FIG. 1).

A procedure for supplying the grease from the grease replenishing device 10 into the rolling bearing 1 will be described hereinafter.

Firstly, as shown in FIG. 1, the grease is previously stored in the first storage chamber 11. The amount of the grease to be stored in the first storage chamber 11 is preferably great enough to enable the supply of the grease into the rolling bearing 1 plural times.

Figure 2A:
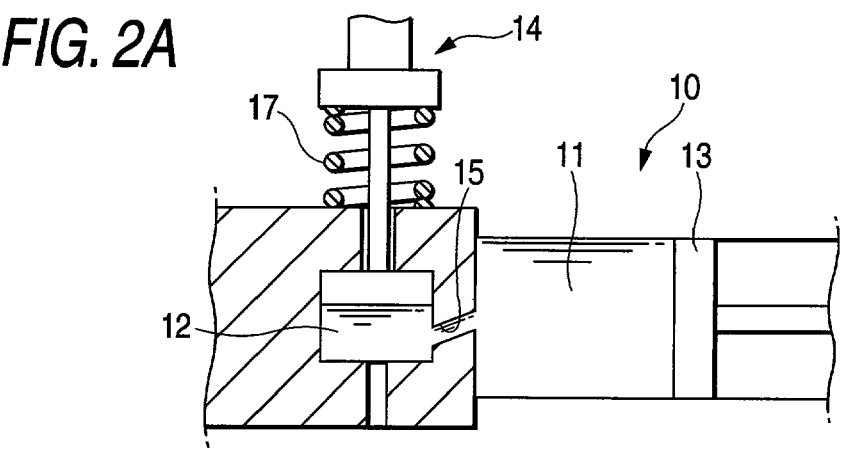
FIGS. 2A to 2C are sectional views illustrating the grease replenishing device according to the first embodiment of the present invention.

In order to start the replenishment of grease, the piston 13 pushes the grease toward the communicating path 15 (leftward as viewed in FIG. 1) as shown in FIG. 2A. Then, the grease flows into the second storage chamber 12 through the communicating path 15. During this procedure, the grease is stored in the second storage chamber 12 in an amount corresponding to the predetermined capacity.

Figure 2B:
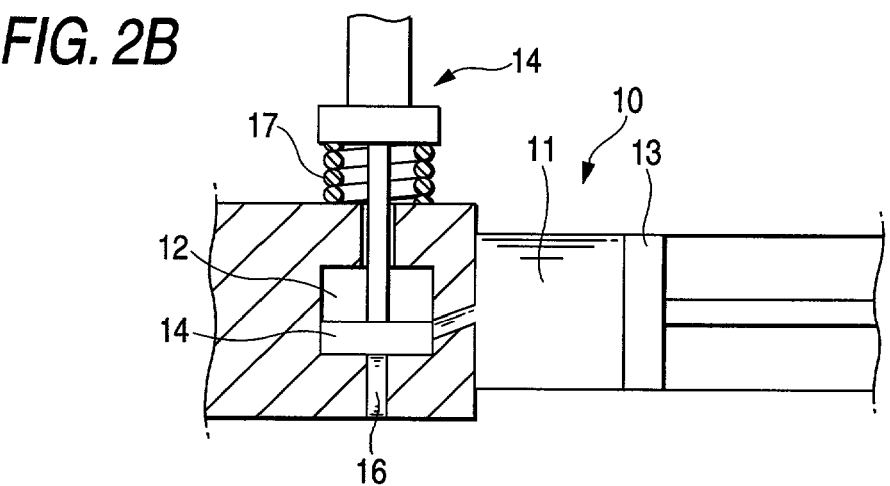

Thereafter, as shown in FIG. 2B, the grease stored in the second storage chamber is pushed out into the feed passage 16 by the pressing member 14, and then supplied into the interior of the rolling bearing 1 through the grease supply hole 6 (see FIG. 1). During this procedure, the piston 13 of the first storage chamber 11 remains in the aforementioned position while keeping a constant pressure to normally energize the grease stored in the first storage chamber toward the second storage chamber. Therefore, while the pressing member 14 keeps pressing the grease in the second storage chamber 12, the grease doesn't flow backward from the communicating path 15 to the first storage chamber 11.

Figure 2C:
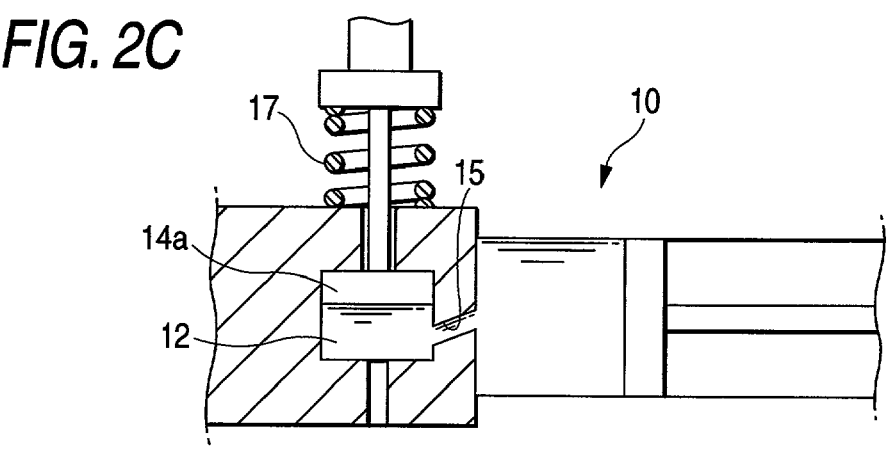

After the supply of the grease into the rolling bearing 1, the piston 14a of the pressing member 14 returns to the original position which was set before the extrusion of the grease by the energization of the spring member 17 as shown in FIG. 2C. At this point, the pressure in the second storage chamber 12 lowers (negative), causing the grease in the first storage chamber 11 which has been compressed at a predetermined pressure to flow through the communicating path 15 into the second storage chamber 12 where it is then stored.

The grease which has thus been stored in the second storage chamber 12 is timely pushed into the interior of the rolling bearing 1 by the pressing member 14.

Further, since the grease stored in the first storage chamber 11 is normally energized toward the second storage chamber 12, the grease is efficiently supplied as the pressing member 14 is driven.

In accordance with this arrangement, the grease is normally stored in the second storage chamber 12. By properly driving the pressing member 14, a proper amount of the grease can be supplied into the rolling bearing 1. Therefore, the grease which has initially been enclosed in the interior of the rolling bearing 1 can be properly replenished with a fresh grease. Accordingly, the rolling bearing 1 can be prevented from being seized due to rapid heat generation or improper lubrication, making it possible to prolong the lifetime thereof.

A second embodiment of the grease replenishing device of the invention will be described in connection with FIG. 3.

The rolling bearing 1 is arranged such that the outer surface of the outer ring 2 is fitted onto the inner surface of the housing 20a. The outer ring 2 has a grease supply hole 6 formed therein for supplying the grease from the grease replenishing device 20 thereinto as in the first embodiment.

The grease replenishing device 20 according to the present embodiment comprises a storage chamber 21 for previously storing the grease, a pressing member 24 for intermittently pushing a part of the grease stored in the storage chamber 21 out of the storage chamber 21 to supply a predetermined amount of the grease into the interior of the rolling bearing 1, and a feed passage 26 communicating between the storage chamber 21 and the rolling bearing 1 to supply the grease into the rolling bearing 1. The storage chamber 21, the pressing member 24 and the feed passage 26 are provided in a housing 20a.

The feed passage 26 is connected to a grease supply hole 6 in the rolling bearing 1 at the site where the rolling bearing 1 and the grease replenishing device 20 are connected to each other (inner surface of the housing 20a). In the present embodiment, the feed passage 26 narrows on the rolling bearing side thereof. The feed passage 26 has a circular section having a diameter of from 0.5 mm to 5 mm on the rolling bearing side thereof.

The pressing member 24 is provided on the side of the storage chamber 21 opposite the feed passage 26. The piston 24a of the pressing member 24 is arranged to be linearly driven toward the feed passage 26 by a screw (not shown). For example, a linear guide mechanism comprising a ball screw and a nut (which are not shown) in combination can be used to move the piston 24a. Alternatively, a screw (not shown) can be manually rotated to move the piston 24a linearly according to the angle of rotation of the screw.

During the supply of grease, the pressing member 24 can intermittently push a part of the grease out of the storage chamber 21 to supply a predetermined amount of the grease into the rolling bearing 1. It can be proposed that the piston 24a be moved by a pneumatic actuator rather than by a screw. However, screw is preferred to pneumatic mechanism to move the piston 24a intermittently and stepwise.

The term "predetermined amount" as used herein is meant to indicate a desired amount of grease to be supplied into the rolling bearing at a batch. This value can be arbitrarily predetermined.

Figure 3:
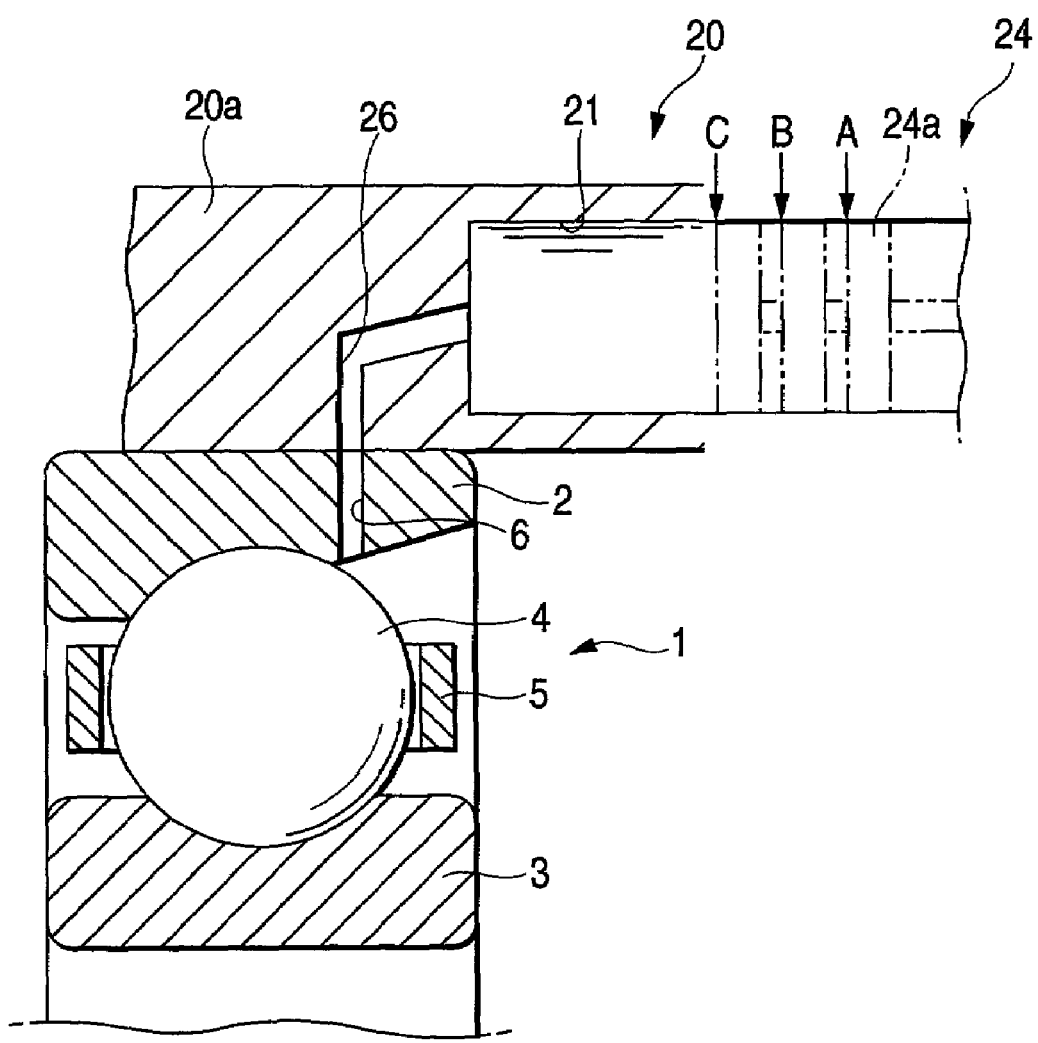
FIG. 3 is a sectional view illustrating a grease replenishing device according to the second embodiment of the present invention.

As shown in FIG. 3, the piston 24a of the grease replenishing device 20 is fixed at an initial position A before replenishment.

At the first grease replenishment, the piston 24a moves to the position B to push the grease to the feed passage 26. The amount of the grease corresponding to the decrease of the capacity of the storage chamber 21 with the displacement of the piston 24a from the initial position A to the position B corresponds to the amount of the grease to be supplied into the interior of the rolling bearing.

At the second grease replenishment, the piston 24a moves from the position B to the position C. Then, the grease is supplied into the interior of the rolling bearing in an amount corresponding to the decrease of the capacity of the storage chamber 21 with the displacement of the piston 24a. The amount of the grease to be supplied may the same as that for the displacement of the piston 24a from the initial position A to the position B. In other words, by intermittently moving the piston 24a in a predetermined displacement in such a direction that the capacity of the storage chamber 21 decreases (leftward as viewed in FIG. 3), the grease can be supplied into the rolling bearing in a predetermined amount corresponding to the predetermined displacement. The distance between the various positions can be adjusted according to the desired amount of the grease to be supplied into the rolling bearing at a batch. However, the amounts of the grease to be supplied into the rolling bearing when the piston 24a makes displacement from the initial position A to the various positions may be different from each other depending on the rotary conditions of the rolling bearing.

In this arrangement, despite its simple structure, the grease replenishing device of the invention can timely and accurately replenish the grease which has initially been enclosed in the interior of the rolling bearing with a predetermined amount of the grease, making it possible to keep the bearing fairly lubricated over an extended period of time. Accordingly, seizing of the bearing due to rapid heat generation and improper lubrication can be prevented, making it possible to prolong the lifetime of the rolling bearing.

The invention is not limited to the aforementioned embodiments but may be subjected to proper change and improvement.

For example, the structure of the rolling bearing is not limited to those described in the present embodiment and may not be a ball bearing. Further, the structure of the rolling bearing is not limited to the structure having a grease supply hole formed in the outer ring but may be arbitrary so far as it allows the grease supplied from the teed passage of the grease replenishing device to be led to the interior of the rolling bearing.

As mentioned above, the invention can provide a grease replenishing device which normally replenishes a rolling bearing with a grease and thus can prolong the lifetime thereof even in a high rotary speed operation.

What is claimed is:

1. A grease replenishing device for replenishing a grease-lubricated rolling bearing with a grease, comprising:
   a storage chamber for storing a grease, said storage chamber comprising a first storage chamber portion for storing the grease, and a second storage chamber portion for receiving a part of the grease stored in the first storage chamber portion; and
   a pressing mechanism, disposed in said second storage chamber portion, for pushing the grease out of the second storage chamber portion into an interior of the rolling bearing;
   wherein the rolling bearing has an outer ring, an inner ring and rolling elements rotatably interposed between the outer ring and the inner ring, the outer ring is fitted in a housing, the first and second storage chamber portions are provided in the housing, and the grease is supplied from a supply hole provided in the outer ring.

2. The grease replenishing device according to claim 1, further comprising an energizing member acting on the grease stored in the first storage chamber portion so as normally to bias the grease toward the second storage chamber portion.

3. The grease replenishing device according to claim 1, wherein the pressing mechanism is a piston, and said replenishing device further comprises a spring member for biasing the piston.

4. A grease replenishing device for replenishing a grease-lubricated rolling bearing with a grease, comprising:
   a storage chamber for storing a grease;
   a pressing mechanism for pushing the grease out of the storage chamber into an interior of the rolling bearing; and
   a drive device for moving said pressing mechanism intermittently to push a part of the grease out of the storage chamber to supply a predetermined amount of the grease into the interior of the rolling bearing, wherein said drive device is a linear actuator.
   wherein the rolling bearing has an outer ring, an inner ring and rolling elements disposed interposed between the outer ring and the inner ring, the outer ring is fitted in a housing, the storage chamber is provided in the housing, and the grease is supplied from a supply hole provided in the outer ring.

5. The grease replenishing device according to claim 4, further comprising:
   a feed passage communicating between the storage chamber and the rolling bearing for allowing the grease to flow into the rolling bearing.

6. The grease replenishing device according to claim 5, wherein the feed passage has a sectional area substantially equal to an area of a circle having a diameter of from 0.5 mm to 5 mm.

7. A grease replenishing device for replenishing a grease-lubricated rolling bearing with a grease, comprising:
   a storage chamber for storing a grease;
   a pressing mechanism for pushing the grease out of the storage chamber into an interior of the rolling bearing; and
   a drive device for moving said pressing mechanism intermittently to push a part of the grease out of the storage chamber to supply a predetermined amount of the grease into the interior of the rolling bearing, wherein said drive device is a pneumatic actuator;
   wherein the rolling bearing has an outer ring, an inner ring and rolling elements rotatably interposed between the outer ring and the inner ring, the outer ring is fitted in a housing, the storage chamber is provided in the housing, and the grease is supplied from a supply hole provided in the outer ring.

8. The grease replenishing device according to claim 7, further comprising:
   a feed passage communicating between the storage chamber and the rolling bearing for allowing the grease to flow into the rolling bearing.

9. The grease replenishing device according to claim 8, wherein the feed passage has a sectional area substantially equal to an area of a circle having a diameter of from 0.5 mm to 5 mm.

10. A grease replenishing device for replenishing a grease-lubricated rolling bearing with a grease, comprising:
- a storage chamber for storing a grease, said storage chamber comprising a first storage chamber portion for storing the grease, and a second storage chamber portion for receiving a part of the grease stored in the first storage chamber portion; and
- a housing containing said storage chamber as well as a first feed passage connecting the first and second storage chamber portions,
- wherein the rolling bearing has an outer ring, an inner ring and rolling elements rotatably interposed between the outer ring and the inner ring, the outer ring is fitted in the housing, and a grease-supply hole is provided in the outer ring that is fitted in the housing, and
- further wherein said housing contains a second feed passage communicating between the supply hole and the second storage chamber portion.

11. The grease replenishing device according to claim 10, further comprising an energizing member acting on the grease stored in the first storage chamber portion so as normally to bias the grease toward the second storage chamber portion.

12. The grease replenishing device according to claim 10, further comprising a pressing mechanism, disposed in said second storage chamber portion, for pushing the grease out of the second storage chamber portion, and a spring member for biasing the pressing mechanism.

13. A grease replenishing device for replenishing a grease-lubricated rolling bearing with a grease, comprising:
- a storage chamber for storing a grease, said storage chamber comprising a first storage chamber portion for storing the grease, and a second storage chamber portion for receiving a part of the grease stored in the first storage chamber portion, wherein the grease-storage capacity of said second storage chamber portion is substantially the same as a predetermined desired amount of grease to be supplied into the rolling bearing at one time; and
- a pressing mechanism, disposed in said second storage chamber portion, for pushing the grease out of the second storage chamber into an interior of the rolling bearing;
- wherein the grease storage capacity of said second storage chamber portion is less than that of said first storage chamber portion,
- wherein the rolling bearing comprises an outer ring, an inner ring and rolling elements rotatably interposed between the outer ring and the inner ring, and the outer ring has a grease supply hole which opens at an inner surface of the outer ring; and
- wherein a feed passage communicates between the grease supply hole of the outer ring and the second storage chamber.

14. The grease replenishing device according to claim 13, wherein the pressing mechanism is a piston, and said replenishing device further comprises a spring member for biasing the piston.

15. The grease replenishing device according to claim 13, further comprising an energizing member acting on the grease stored in the first storage chamber portion so as normally to bias the grease toward the second storage chamber portion.

16. The grease replenishing device according to claim 13, wherein the feed passage has a sectional area substantially equal to an area of a circle having a diameter of from 0.5 mm to 5 mm.

17. The grease replenishing device according to claim 16, wherein the pressing mechanism is a piston, and said replenishing device further comprises a spring member for biasing the piston.

18. The grease replenishing device according to claim 16, further comprising an energizing member acting on the grease stored in the first storage chamber portion so as normally to bias the grease toward the second storage chamber portion.

19. A grease replenishing device for replenishing a grease-lubricated rolling bearing with a grease, comprising:
- a storage chamber for storing a grease, said storage chamber comprising a first storage chamber portion for storing the grease, and a second storage chamber portion for receiving a part of the grease stored in the first storage chamber portion, wherein the grease-storage capacity of said second storage chamber portion is substantially the same as a predetermined desired amount of grease to be supplied into the rolling bearing at one time; and
- a pressing mechanism, disposed in said second storage chamber portion, for pushing the grease out of the second storage chamber into an interior of the rolling bearing;
- wherein the grease storage capacity of said second storage chamber portion is less than that of said first storage chamber portion, and
- wherein the rolling bearing has an outer ring, an inner ring and rolling elements rotatably interposed between the outer ring and the inner ring, the outer ring is fitted in a housing, the first and second storage chamber portions are provided in the housing, and the grease is supplied from a supply hole provided in the outer ring.

* * * * *